(12) United States Patent
Klassen et al.

(10) Patent No.: US 7,376,269 B2
(45) Date of Patent: May 20, 2008

(54) SYSTEMS AND METHODS FOR DETECTING IMAGE QUALITY DEFECTS

(75) Inventors: R. Victor Klassen, Webster, NY (US); Stephen C. Morgana, Brockport, NY (US)

(73) Assignee: Xerox Corporation, Norwalk, CT (US)

( * ) Notice: Subject to any disclaimer, the term of this patent is extended or adjusted under 35 U.S.C. 154(b) by 618 days.

(21) Appl. No.: 10/992,726

(22) Filed: Nov. 22, 2004

(65) Prior Publication Data

US 2006/0110009 A1 May 25, 2006

(51) Int. Cl.
*G06K 9/00* (2006.01)
*G03F 3/08* (2006.01)

(52) U.S. Cl. ........................ 382/167; 358/518
(58) Field of Classification Search ................ 382/167, 382/162; 358/518–523
See application file for complete search history.

(56) References Cited

U.S. PATENT DOCUMENTS

| | | |
|---|---|---|
| 4,311,914 A | 1/1982 | Huber |
| 5,107,332 A | 4/1992 | Chan |
| 5,235,652 A | 8/1993 | Nally |
| 5,510,896 A | 4/1996 | Wafler |
| 5,535,313 A | 7/1996 | Schwab |
| 5,587,728 A | 12/1996 | Edgar |
| 5,999,636 A | 12/1999 | Juang |
| 6,009,197 A * | 12/1999 | Riley ........................ 382/199 |
| 6,377,758 B1 | 4/2002 | OuYang et al. |
| 6,724,461 B1 | 4/2004 | Yamazaki |
| 6,996,272 B2 * | 2/2006 | Chen et al. ................. 382/173 |
| 2002/0145747 A1* | 10/2002 | Burquist et al. ........... 358/1.14 |
| 2003/0020945 A1* | 1/2003 | Lopez et al. ............... 358/1.15 |
| 2005/0259867 A1* | 11/2005 | Sones ........................ 382/159 |

OTHER PUBLICATIONS

U.S. Appl. No. 10/923,614, filed Aug. 20, 2004.

* cited by examiner

*Primary Examiner*—Matthew C. Bella
*Assistant Examiner*—Randolph Chu
(74) *Attorney, Agent, or Firm*—Oliff & Berridge, PLC

(57) ABSTRACT

Systems and methods for detecting image quality defects in images rendered by a rendering device. Original image data is rendered by an image rendering device, and the rendered image is captured by an image capturing device. Regions of interest may be identified to provide information indicating where image quality defects of the rendering device, may be identified. At each region of interest, the original image data may be compared to the captured image data of a corresponding region of interest to determine color difference of the captured image at the region of interest. The color difference may be subsequently converted from a device independent color space to a device dependent color space. Based on the converted color difference and input intensity of the original image data at the region of interest, a colorant error may be determined for the region of interest, and/or a scan line and a row line including the region of interest.

17 Claims, 11 Drawing Sheets

SYSTEMS AND METHODS FOR DETECTING IMAGE QUALITY DEFECTS

BACKGROUND

1. Field

This invention generally relates to systems and methods for detecting image quality defects generated by a rendering device.

2. Related Art

Image rendering devices such as photocopiers, printers, facsimile machines, and other image producing devices, have been widely used in commerce and industry. Computing devices have also been widely used in commerce and industry. Higher demand for these computing devices has resulted in faster processing speeds that are sufficient for electronically detecting defects in the images rendered by image rendering devices. Detection of image quality defects ensures the production of quality images by image rendering devices.

There are various existing approaches for detecting image quality defects in images rendered by image rendering devices. For example, in order to detect image quality defects, images rendered by an image rendering device, such as a printer, are captured by an image capturing device, such as a camera, a scanner, or the like, are compared with synthetic models of an ideal scene, e.g., a standard test page designed to provide information about the performance of the printer, to detect the existence of an artifact or defect in the image. Further, U.S. Pat. No. 6,377,758 describes a method and a system for analyzing imaging problems by printing an image, scanning the printed image and comparing the scanned image and the original image on a pixel by pixel basis to detect defects generated by an intermediate imaging member.

Although some image quality defects may not be visible, these image quality defects may indicate that the device is deteriorating, and presage image quality defects that are visible. Other image quality defects may be largely of a geometric nature and caused by distortion due to slight warping of the rendered image, small misalignment of the captured image, mapping errors between the image capture device and the image rendering device, and other systematic defects of the image rendering devices not related to degradation of the rendering device. Therefore, it would be desirable to detect the image quality defects early, so the image rendering device may be adjusted or repaired to reduce or even avoid image quality defects. Furthermore, it is desirable to detect only the image quality defects that are either visible or presage visible errors.

SUMMARY

A method of detecting image quality defects may include obtaining an electronic image including electronic image data, rendering an image based on the electronic image data, capturing the rendered image, the captured image including captured image data; registering the electronic image with the captured image, identifying at least one region of interest in the electronic image, and comparing the electronic image data of the at least one region of interest in the electronic image and the captured image data of a corresponding region to determine a colorant error.

Identifying the at least one region of interest in the electronic image may include setting a value of the at least one region of interest in the electronic image to a first predetermined value.

Identifying the at least one region of interest in the electronic image may also include setting a value of portions other than the at least one region of interest in the electronic image to a second predetermined value.

Comparing the electronic image data of the at least one region of interest in the electronic image and the captured image data at the corresponding region may include comparing data at the region of interest having the first predetermined value.

The method of detecting image quality defects may further include identifying at least one region of interest in the captured image.

Identifying the at least one region of interest in the captured image may include setting a value of the at least one region of interest in the captured image to the first predetermined value.

Identifying the at least one region of interest in the captured image may also include setting a value of portions other than the at least one region of interest in the captured image to the second predetermined value.

Comparing the electronic image data of the at least one region of interest in the electronic image and the captured image at the corresponding region may include comparing data where both the region of interest and the corresponding region has the first predetermined value.

The method of detecting image quality defects may further include converting each colorant error from a device independent color space to a device dependent color space.

The device independent color space may include one of $L^*a^*b^*$ and RGB color space. The device dependent color space may include CMYK color space.

The method of detecting image quality defects may further include mapping input intensity of the electronic image, at each region of interest, to the colorant error for the corresponding region of interest.

The method of detecting image quality defects may further include detecting defects in the rendered image based on the mapping.

A system for detecting image quality defects of an image rendered by a rendering device may include an image data source that provides image data of an original image, an image rendering device that provides a rendered image of the original image, an image capturing device that captures the rendered image, and a processing device that processes the original image data and the captured image data to detect at least one region of interest, compares the image data of the at least one region of interest with the captured image, and determines colorant errors in the rendered image at the regions of interest.

A computer readable medium may be provided that includes instructions readable by a computer. The instructions may include instructions for obtaining an electronic image including electronic image data, instructions for rendering the electronic image data, instructions for capturing the rendered image, the captured image including captured image data, instructions for registering the electronic image with the captured image, instructions for identifying at least one region of interest in the electronic image, and instructions for comparing the electronic image data of the at least one region of interest in the electronic image and the captured image data of a corresponding region to determine a colorant error.

A customer may render original electronic image data and adjust or repair a device rendering the original electronic image data in order to obtain an image with a desired quality based on a captured image of the rendered image.

These and other features are described in or are apparent from the following detailed description.

BRIEF DESCRIPTION OF THE DRAWINGS

Various exemplary details are described herein, with reference to the following figures, wherein.

DETAILED DESCRIPTION OF EXEMPLARY EMBODIMENTS

The following detailed description is directed to a specific type of image rendering device, namely a printer. However, it should be appreciated that the description is for ease of understanding and familiarity only, and does not exclude other types of image rendering devices, whether known or hereafter developed.

Further, the following detailed description is directed to a specific type of image capture device, namely a scanner. However, it should be appreciated that the description is also for ease of understanding and familiarity only, and does not exclude other types of image capturing devices, whether known or hereafter developed.

Figure 1:
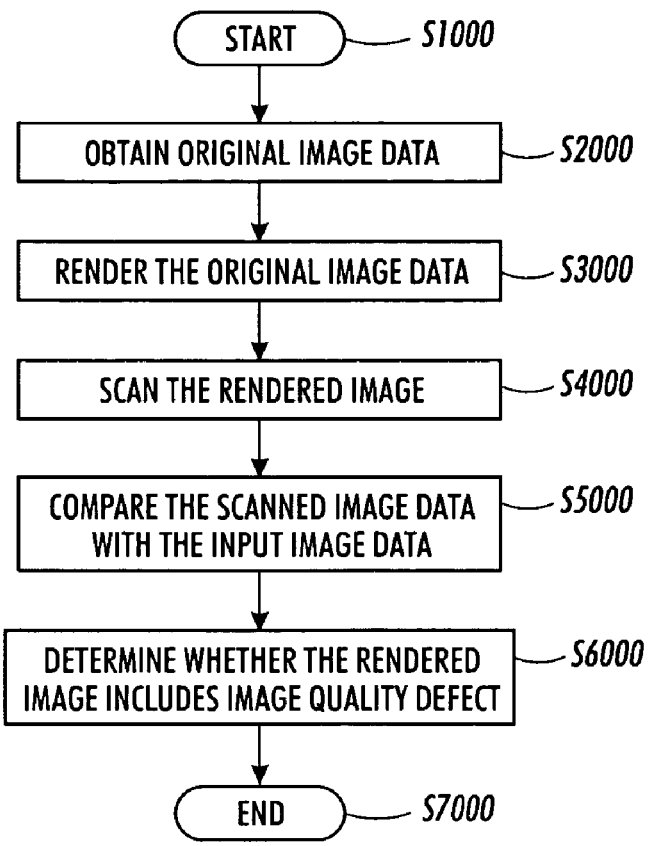
FIG. 1 is a flowchart outlining an exemplary method of detecting image quality defects.

FIG. 1 is a flowchart outlining an exemplary method of detecting image quality defects. As shown in FIG. 1, operation of the method begins in step S1000 and continues to step S2000, where original image data is obtained. The original image data may be obtained by any known or hereafter developed method or device capable of providing electronic image data, such as by image capture using, for example, a scanner or other device.

The original image data obtained in step S2000 is rendered in step S3000. Next, in step S4000, the rendered image is scanned. Then, in step S5000, the image data of the scanned image is compared to input image data. Next, whether the rendered images include image quality defects is determined in step S6000. Operation of the method then continues to step S7000, where the method ends.

Figure 2:
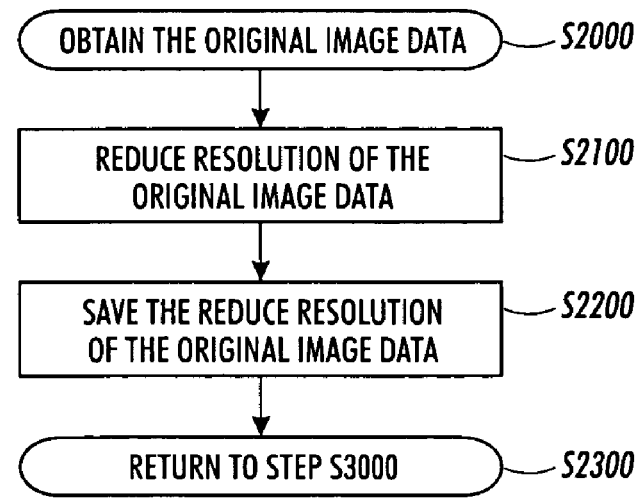
FIG. 2 is a flowchart outlining in greater detail an exemplary method of receiving the original image data.

FIG. 2 is a flowchart outlining in greater detail an exemplary method of obtaining the original image data. It should be appreciated that FIG. 2 is particularly directed to a reduced resolution of the original image. The resolution is reduced to increase processing speed and reduce the affect of noise, such as unimportant high frequency noises, e.g., half-tone screens. Although the detailed description is directed to analyzing the original image data at a reduced resolution, it should be appreciated that this aspect is not required and that the resolution of the image may vary.

As shown in FIG. 2, operation of the method continues form step S2000 to step S2100, where the resolution of the original image data is reduced. Then, in step S2200, the reduced resolution version of the original image data is saved for later image comparison. Operation then continues to step S2300, where operation returns to step S3000.

Figure 3:
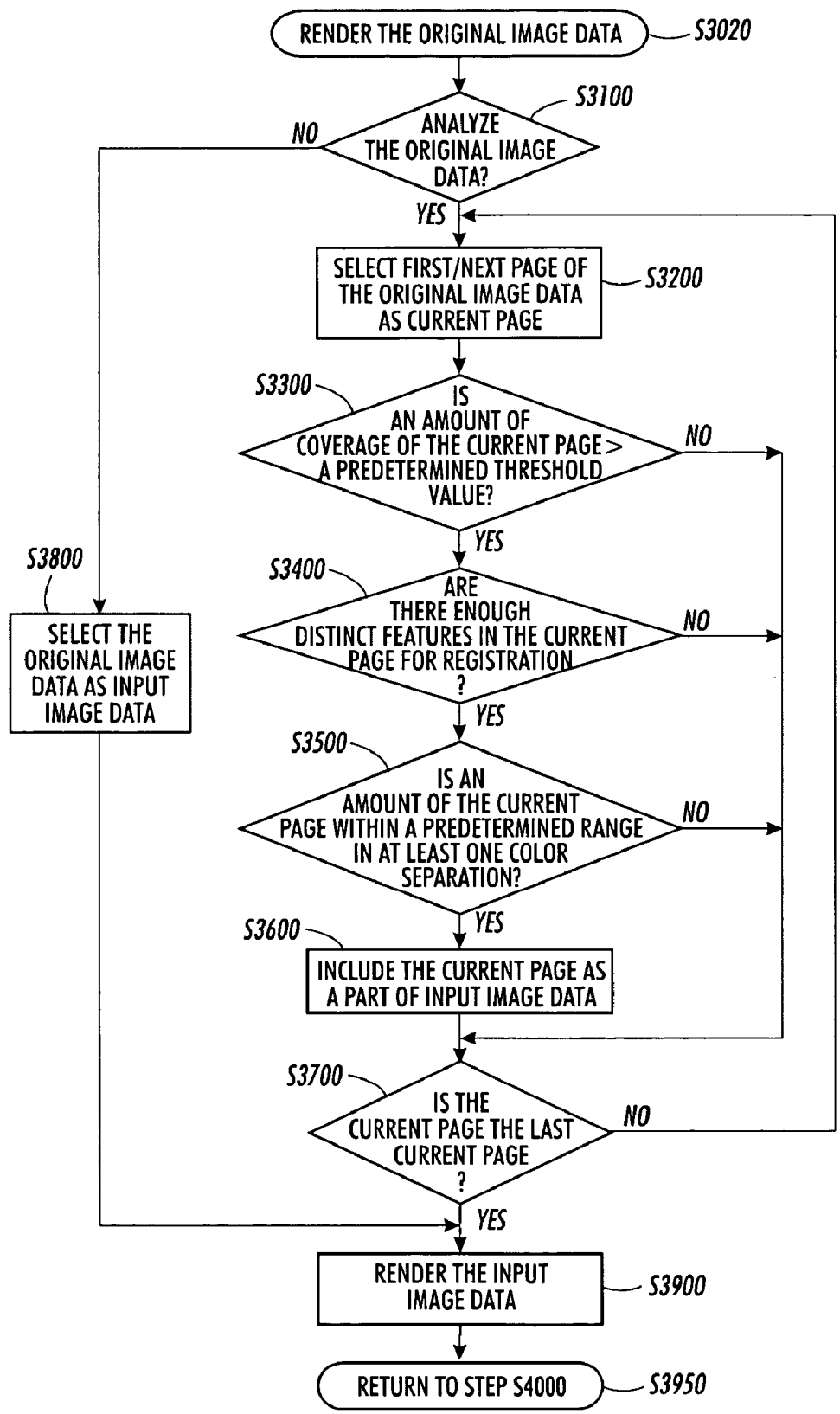
FIG. 3 is a flowchart outlining in greater detail an exemplary method of rendering the original image data.

FIG. 3 is a flowchart outlining in greater detail an exemplary method of rendering the original image. It should be appreciated that FIG. 3 is particularly directed to a preliminary analysis of the original image data. The preliminary analysis is performed on the original image data to determine which information, e.g., pages of the original electronic image, is an eligible candidate for diagnostics by eliminating various types of image data that are not considered to provide information about rendering behavior that may be useful in determining defects in the image rendered by the rendering device, e.g., a printer, to reduce or even avoid image quality defects.

As shown in FIG. 3, operation of the method continues from step S3000 to step S3100, where a determination is made whether the original image data should be preliminarily analyzed. If so, operation continues to step S3200. Otherwise, operation jumps to step S3700.

In step S3200, a first or next page of the original image data is selected as a current page. Then, in step S3300, a determination is made whether an amount of coverage of the current page is greater than a predetermined threshold value. Therefore, only pages that have at least a minimum amount of coverage can be identified for subsequent analysis. If not, operation jumps to step S3700. Otherwise, operation continues to step S3400.

In step S3400, a determination is made whether the current page has enough distinct features for registration. Therefore, only pages that are capable of being registered can be identified for subsequent analysis. If not, operation jumps to step S3700. Otherwise, operation continues to step S3500.

In step S3500, a determination is made whether an amount of content of the current page is within a predetermined range in at least one color separation. Therefore, only pages that contain some content, neither indicative of white paper nor full toner coverage, can be identified for subsequent analysis. If not, operation jumps to step S3700. Otherwise, operation continues to step S3600.

In step S3600, the current page is included as a part of input image data. Then, in step S3700, a determination is made whether the current page is a last page current page. If not, operation returns to step S3200. Otherwise, operation jumps to step S3800.

In step S3800, the original image data is selected as input image data of an input image. Therefore, if the preliminary analysis is not performed, the input image corresponds to the original image. Accordingly, the reduced resolution of the input image data corresponds to the reduced resolution of the original image data. Although the detailed description is directed to analyzing the input image data at a reduced resolution, it should be appreciated that this aspect is not required and that the resolution of the image may vary. Then, in step S3900, the input image data is rendered. Operation then continues to step S3950, where operation returns to step S4000.

For example, image data corresponding to white pages, page edges and whole pages containing fine text in at least one color space separation may not provide useful information about the printer's behavior. When trying to register the original electronic images and the corresponding scanned images, the largest error may be found at edges. These edges include page edges and fine text that is formed of edges where any small misalignment may appear as a printing error when the problem is really that of misalignment. Because the alignment of the page edges and fine text can be difficult to process correctly, ignoring such information may be beneficial. It may also desirable to scan only pages having a minimum coverage area greater than a predetermined threshold value and sufficient distinct features to allow registration.

In other words, if a page of the original image contains regions that are not sufficiently large to be useful and contains too many edges, then it may be desirable to skip that page scan. Although the preliminary analysis of the original image data is optional, scanned information is presumably communicated along a wire to perform further processing (unless processing is performed on a scan bar). Therefore, the preliminary analysis to identify pages that are not considered useful for scanning reduces processing time and communications bandwidth by not subsequently scanning the identified pages.

Figure 4:
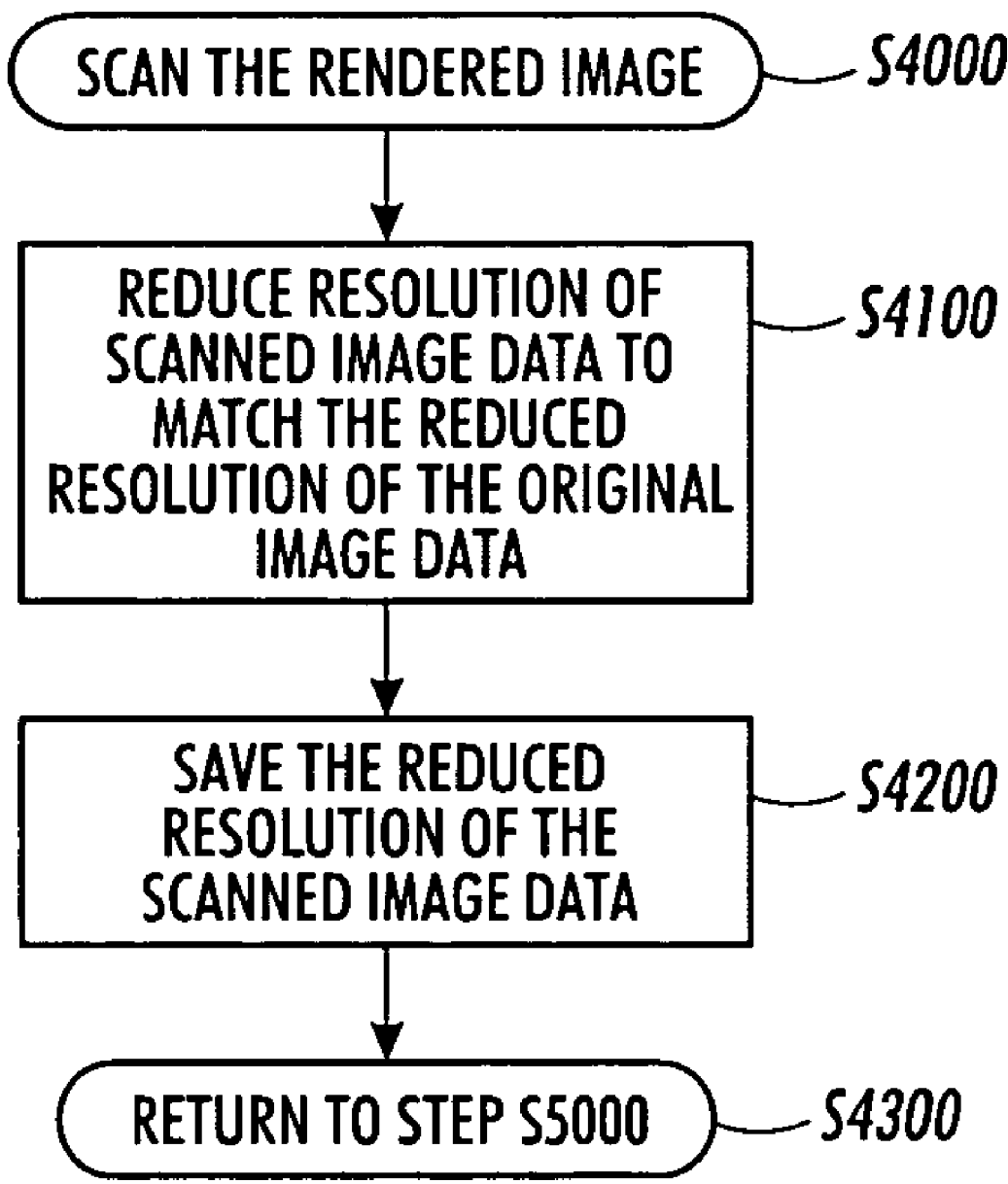
FIG. 4 is a flowchart outlining in greater detail an exemplary method of scanning the rendered image.

FIG. 4 is a flowchart outlining in greater detail an exemplary method of scanning the rendered image. As shown in FIG. 4, operation of the method continues from step S4000 to step S4100, where the resolution of the scanned image data is reduced. A reduced resolution of 75 lines per inch, for example, may be desirable to reduce an amount of half-tone noise and errors.

Then, in step S4200, the reduced resolution version of the scanned image data is saved for later image comparison. Operation then continues to step S4300, where operation returns to step S5000.

For example, a scanner may be provided to capture the rendered images. If the scanner is provided as an internal component of the rendering device, e.g., a printer, all pages of the original electronic image may be scanned, but the associated input image data of pages that are not subsequently identified as regions of interest may not be communicated for the image comparison. If the scanner is provided externally of the printer, an operator may decide to skip the scan of particular pages by manually discarding pages that do not contain regions of interest.

Although the detailed description is directed to analyzing original image data and scanned image data at the same reduced resolution, it should be appreciated that this aspect is not required and that the resolution of the image may vary as described. It is desirable that the reduced resolution may be any resolution that matches the resolution of the captured image so that the scanned images and the original images may be directly compared. However, if the resolutions are different, the data of either the scanned image or the original image may be interpolated to generate data having the same resolution as the other.

FIGS. 5-9 are flowcharts outlining in greater detail an exemplary method of comparing the scanned image data with the input image data.

Figure 5:
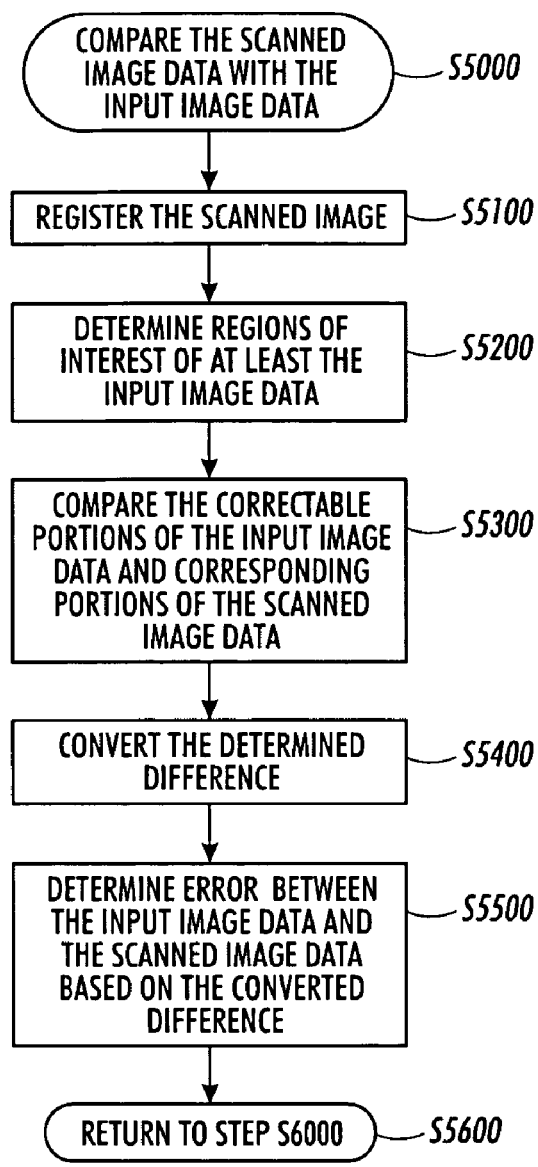
FIG. 5 is a flowchart outlining in greater detail an exemplary method of comparing the scanned image data with the input image.

As shown in FIG. 5, operation of the method continues from step S5000 to step S5100, where the scanned image is registered, as described in greater detail with reference to FIG. 6. Then, in step S5200, regions of interest of the input image data are determined, as described in greater detail with reference to FIG. 7. Next, in step S5300, the determined regions of interest are compared with corresponding regions of interest of the scanned image data to determine a color difference, as described in greater detail with reference to FIG. 8. Operation then continues to step S5400.

In step S5400, the determined color differences are converted. For example, the color difference may be determined in an international standard color space such as a CIE L*a*b* color space or any other device independent color space. However, in order to more accurately determine errors in images rendered by a particular rendering device, the color differences may be converted to a CMYK colorant space including four separations of cyan C, magenta M, yellow Y, and black K, or any other device dependent color space. The color difference conversion is described in U.S. patent application Ser. No. 10/923/614 filed Aug. 20, 2004 herein incorporated by reference.

Although the detailed description is directed to a specific type of color spaces, namely a CIE L*a*b* color space and a CMYK color space, any other suitable color spaces may be involved. Further, the approach described herein may be applied to gray value images rather than color images. Operation then continues to step S5500.

Figure 9:
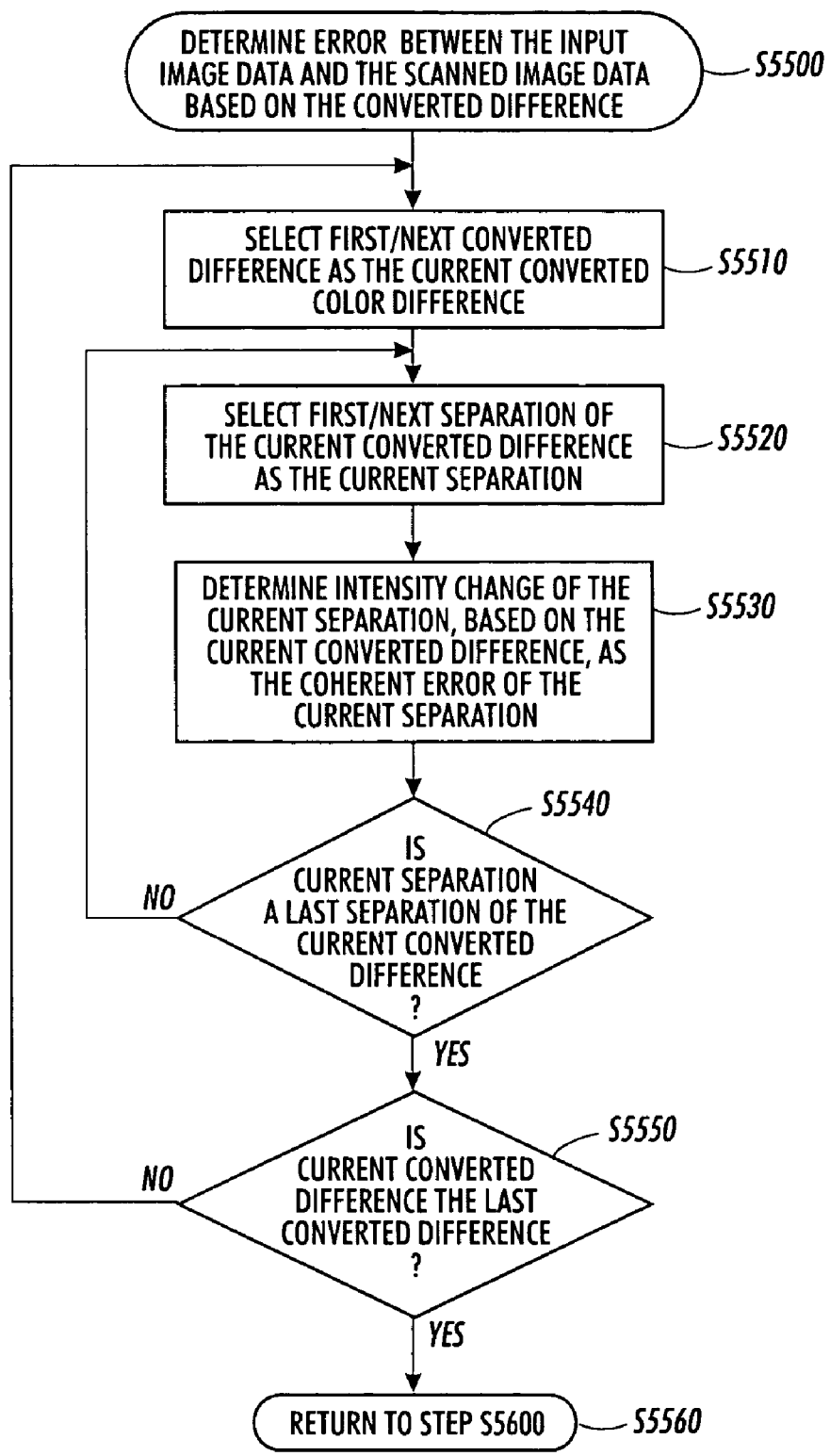
FIG. 9 is a flowchart outlining in greater detail an exemplary method of determining errors between the input image data and the scanned image data based on converted differences.

In step S5500, errors between the input image data and the scanned image data are determined based on converted differences, as described in greater detail with respect to FIG. 9. Operation then continues to step S5600, where operation returns to step S6000.

Figure 6:
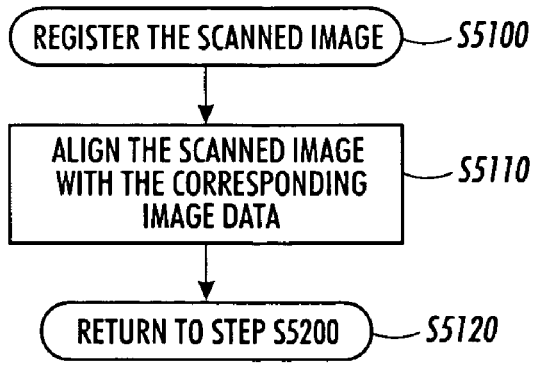
FIG. 6 is a flowchart outlining in greater detail an exemplary method of registering the scanned image.

FIG. 6 is a flowchart outlining in greater detail an exemplary method of registering the scanned image. As shown in FIG. 6, operation of the method continues from step S5100 to step S5110, where the scanned image is aligned with the input image. Operation then continues to step S5120, where operation returns to step S5200.

In order to increase processing speed and reduce the effect of noise such as unimportant high frequency noises, e.g. half-tone screens; the reduced resolution (rather than the full resolution) scanned images and the input images are aligned; however it should be appreciated that any resolution of the scanned images and the input images may be aligned. Further, it should be appreciated that the scanned images may be registered with the corresponding input images by any known or hereafter developed alignment method or device. It should be appreciated that the scanned image may be aligned with the input image by any known or hereafter developed method of aligning images.

For example, U.S. Pat. No. 4,511,242 describes obtaining alignment information by placing an original document containing vernier calibrations on the document class and a target document containing vernier calibrations in the copy sheet bin. By producing a copy of the original document onto the target document produces a double set of vernier calibrations on the target document, which, when compared, provide information relating to skew angle, side edge relationship and leading edge alignment of the image to the copy sheet. The vernier calibrations provide data which may be read by a microprocessor to determine misalignment.

Figure 7A:
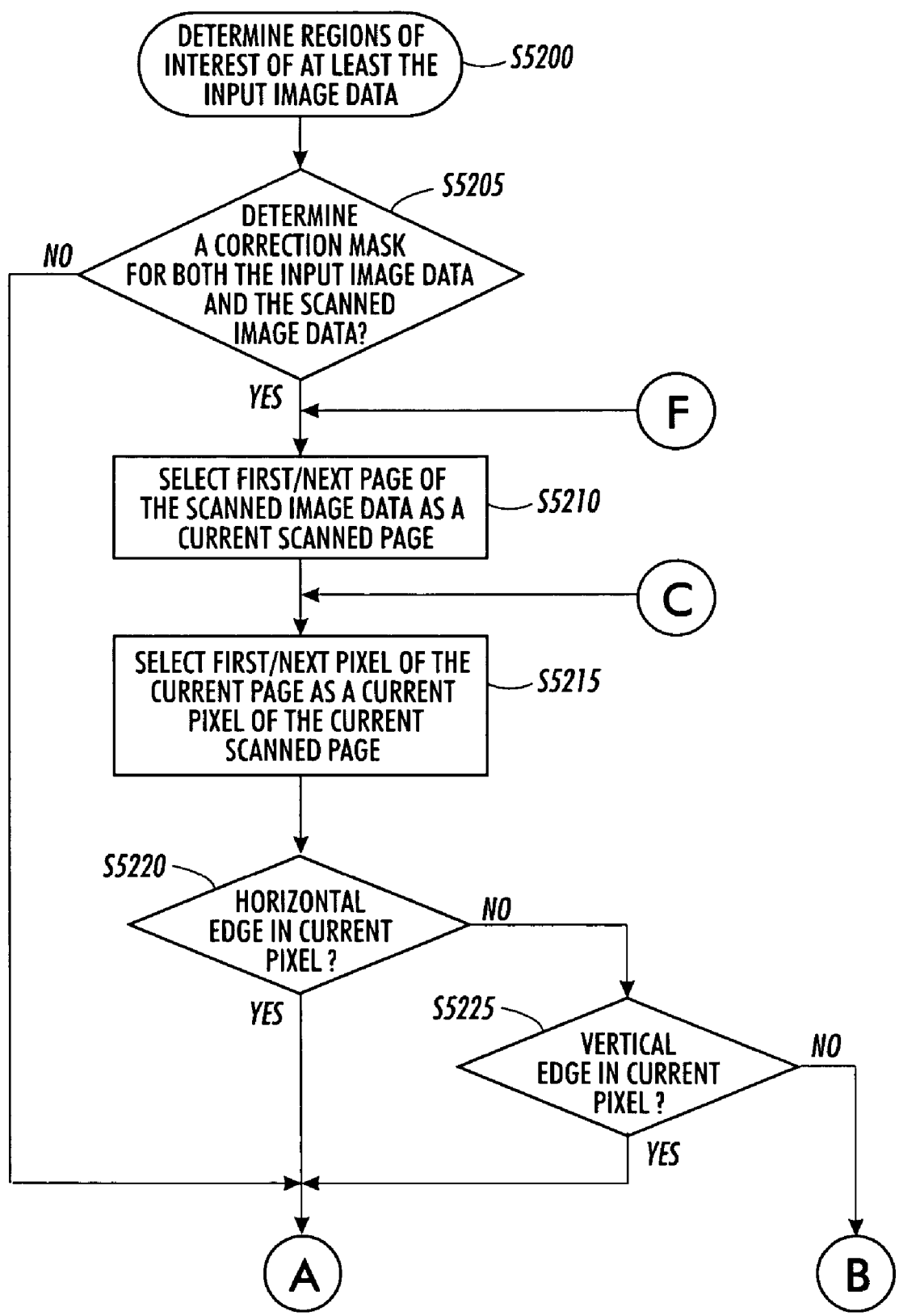
FIG. 7 is a flowchart outlining in greater detail an exemplary method of determining regions of interest of the input image.
Figure 7B:
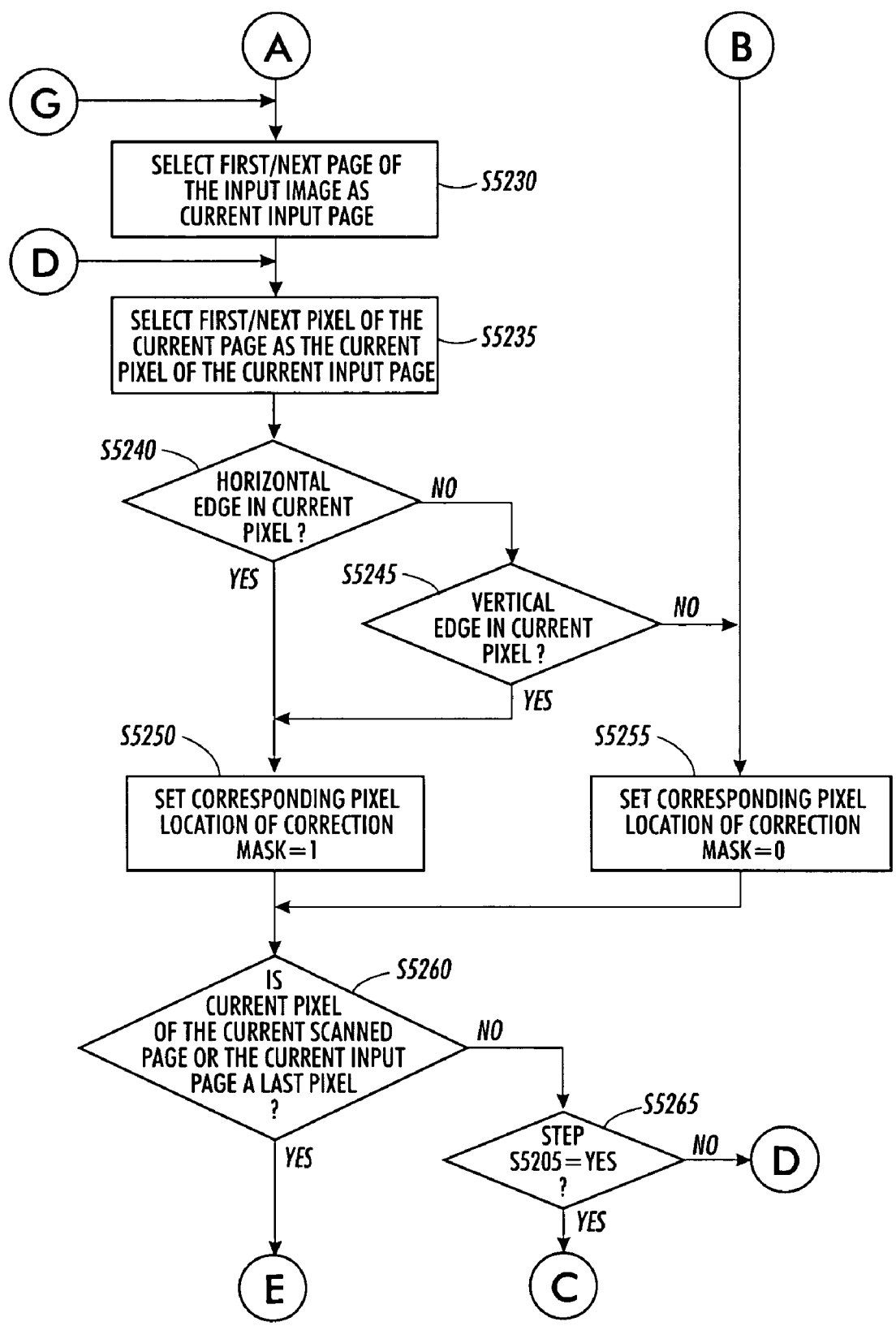
Figure 7C:
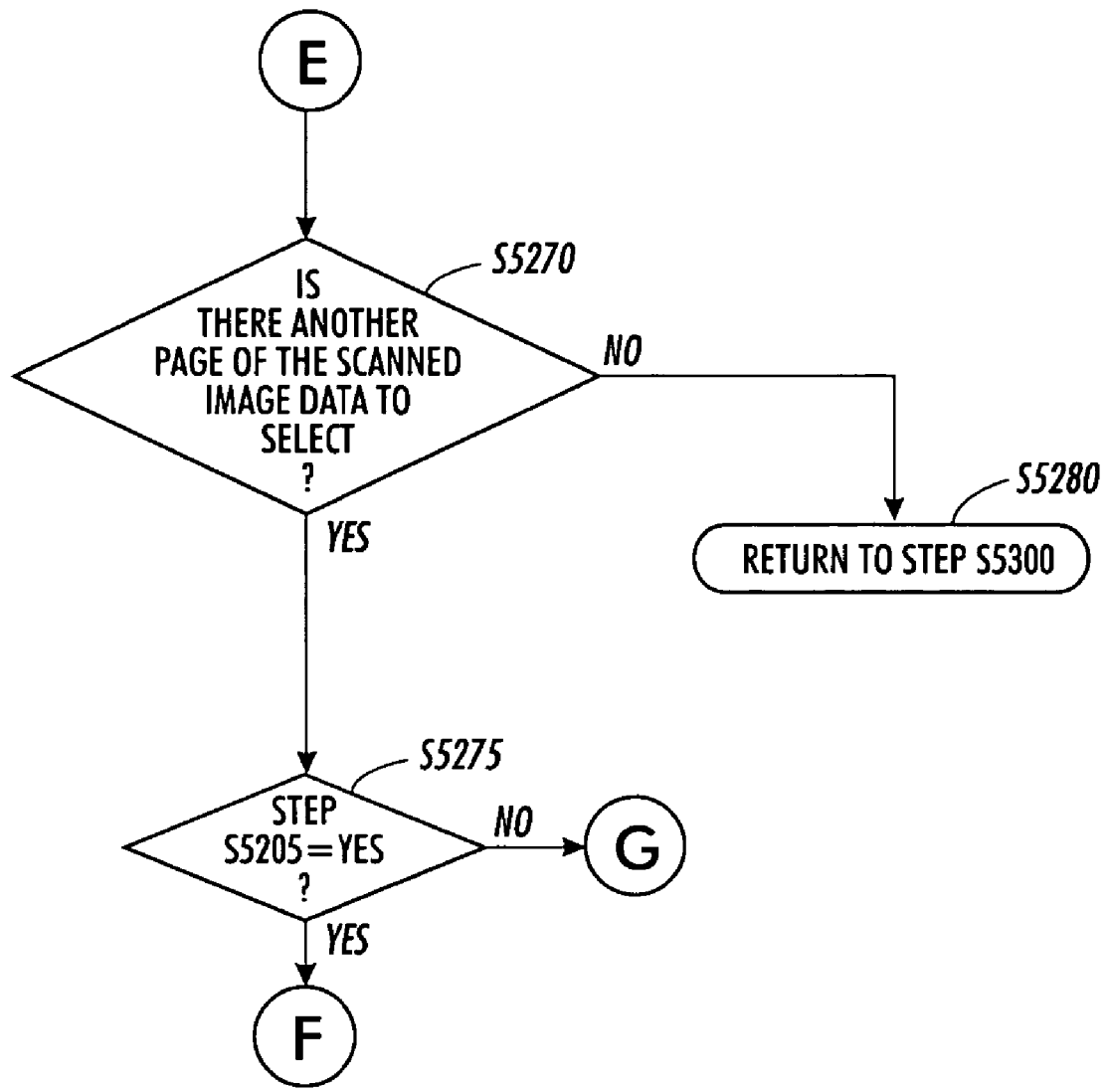

FIG. 7 is a flowchart outlining in greater detail an exemplary method of determining the regions of interest of the input image data. By determining regions of interest of the input image data, images providing useful information about printer behavior may be separately identified, e.g., in a correction mask, to exclude various types of image data that are not considered to provide useful information about printer behavior in determining defects in images rendered by an image rendering device, e.g., a printer. Therefore, the input image data may be compared with corresponding scanned image data at corresponding regions of interest to further reduce processing time.

As shown in FIG. 7, operation of the method continues from step S5200 to step S5205, where a determination is made whether a correction mask is to be created for both the input image data and the scanned image data. If so, operation continues to step S5210. Otherwise, operation jumps to step S5230.

In step S5210, a first or next page of the scanned image is selected as a current scanned page. Then, in step S5215, a first or next pixel of the current scanned page is selected as a current scanned pixel of the current scanned page. Next, in step S5220, a determination is made whether the current scanned pixel contains a horizontal edge. For example, a pixel may be determined to contain a horizontal edge if a value associated with the pixel is greater than a predetermined threshold value. If so, operation jumps to step S5230. Otherwise, operation continues to step S5225.

In step S5225, a determination is made whether the current scanned pixel contains a vertical edge. For example, a pixel may be determined to contain a vertical edge if another value associated with the pixel is greater than a predetermined threshold value. If so, operation continues to step S5230. Otherwise, operation jumps to step S5255.

In step S5230, a first or next page of the input image is selected as a current input page. Then, in step S5235, a first or next pixel of the current input page is selected as a current input pixel of the current input page. Next, in step S5240, a determination is made whether the current input pixel contains a horizontal edge. For example, a pixel may be determined to contain a horizontal edge if a value associated with the pixel is greater than a predetermined threshold value. If so, operation jumps to step S5250. Otherwise, operation continues to step S5245.

In step S5245, a determination is made whether the current input pixel contains a vertical edge. For example, a pixel may be determined to contain a vertical edge if another value associated with the pixel is greater than a predetermined threshold value. If so, operation continues to step S5250. Otherwise, operation jumps to step S5255.

In step S5250, a corresponding pixel location of a correction mask is set to a true value (1). Although the true value (1) is set when either a horizontal edge value or a vertical edge value is greater than a predetermined threshold value, the corresponding pixel location may be set to the true value (1), indicating an edge, if a sum of the values associated with the pixel is greater than a predetermined value. Operation then jumps to step S5260. In contrast, in step S5255, a corresponding pixel location of a correction mask is set to a false value (0). Operation then continues to step S5260.

In step S5260, a determination is made whether the current pixel of the current scanned page or the current input page is a last pixel. If so, operation jumps to step S5270. Otherwise, operation continues to step S5265.

In step S5265, a determination is made whether a correction mask to be created for both the input image data and the scanned image data has been previously determined in step S5205. If so, operation returns to step S5215. Otherwise, operation returns to step S5235.

In step S5270, a determination is made whether there is another page of the scanned image data to select. If so, operation continues to step S5275. Otherwise, operation jumps to step S5280.

In step S5275, a determination is made whether a correction mask to be created for both the input image data and the scanned image data has been previously determined in step S5205. If so, operation returns to step S5210. Otherwise, operation returns to step S5230. In step S5280, operation of the method returns to step S5300.

Edges may be identified by any known or hereafter developed edge detection method or device such as Sobel edge detection filters. For example, weights in an X-filter and a Y-filter are applied to a given pixel, of an original image, having a 3×3 neighborhood of pixels. The weights of the X-filter and the Y-filter may be represented as follows:

| X-filter: | −1 | −2 | −1 | Y-filter: | −1 | 0 | 1 |
|---|---|---|---|---|---|---|---|
| | 0 | 0 | 0 | | −2 | 0 | 2 |
| | 1 | 2 | 1 | | −1 | 0 | 1 |

Based on relative weighted values of the neighboring pixels, the existence of an edge at the given pixel can be detected. For example, an associated input intensity value is multiplied by a respective weight in the X-filter for the each of the respective pixels. Then, a sum of the weighted values is compared to a threshold value to determine if a horizontal edge exists. If the sum is above the threshold value, e.g., a positive or negative value that is too far from zero (0), then the given pixel is identified as a region containing horizontal edge content. If all pixels in the neighborhood of the given pixel are equal, i.e. the sum substantially equals zero, then the given pixel is identified as a region with little or no edge content. Then, the above process is performed using the Y-filter to identify the given pixel as a region containing vertical edge content. The X-filter and the Y-filter are applied to each pixel of at least the original image.

Once the existence of edge content has been determined, for each pixel of the original image, the sum of the X-filter or the Y-filter, either alone or combined, is compared to a predetermined threshold value or range to determine whether the pixel has too much, none or little edge content. For pixels having too much edge content, a corresponding pixel location in a correction mask is set as false (0) to indicate that the respective pixel contains information that is not useful in determining image quality errors in the rendering device. For the pixels that are not within the predetermined threshold value or range, a corresponding pixel location in the correction mask is set as true (1) to indicate that the respective pixel contains information that is useful in determining image quality errors in the rendering device.

A correction mask may be determined for the pixels of the original image only, or a correction mask may be determined for the pixels of both the original image and the scanned image. If a correction mask is to be determined for pixels in the original image only, then edge detection is performed for the original image only, and error detection is subsequently performed based on the correction mask for the original image. Alternatively, the correction mask an be determined as a part of the preliminary analysis of the original image data, for example, as described above with respect to FIG. 3.

If a correction mask is to be determined for both pixels of the original image and the scanned image, edge detection alone may be performed in the scanned image only, and both edge detection and white detection may be performed in the original image. At pixel locations identified by both correction masks as true (1), the pixel location may be identified as a region of interest. For example, the correction mask of the original image with the correction mask of the scanned image may be multiplied so the final result at that pixel location is zero (0) in places where either correction mask is zero and one (1) in places where both correction masks are one (1). Therefore, if the original image or scanned image contains white pages or too much edge content such as misaligned edges, then subsequent error detection is not performed on those regions.

It should be appreciated that FIG. 7 is particularly directed to detecting horizontal and vertical edges in pixels. However, it should be appreciated that any type of edge, e.g., a diagonal edge having a middle value for both the X-filter and the Y-filter, may also be detected to determine the regions of interest. Further, it should be appreciated that the predetermined threshold value may include a range of values for which detected edges may be indicated as regions of interest.

Figure 8:
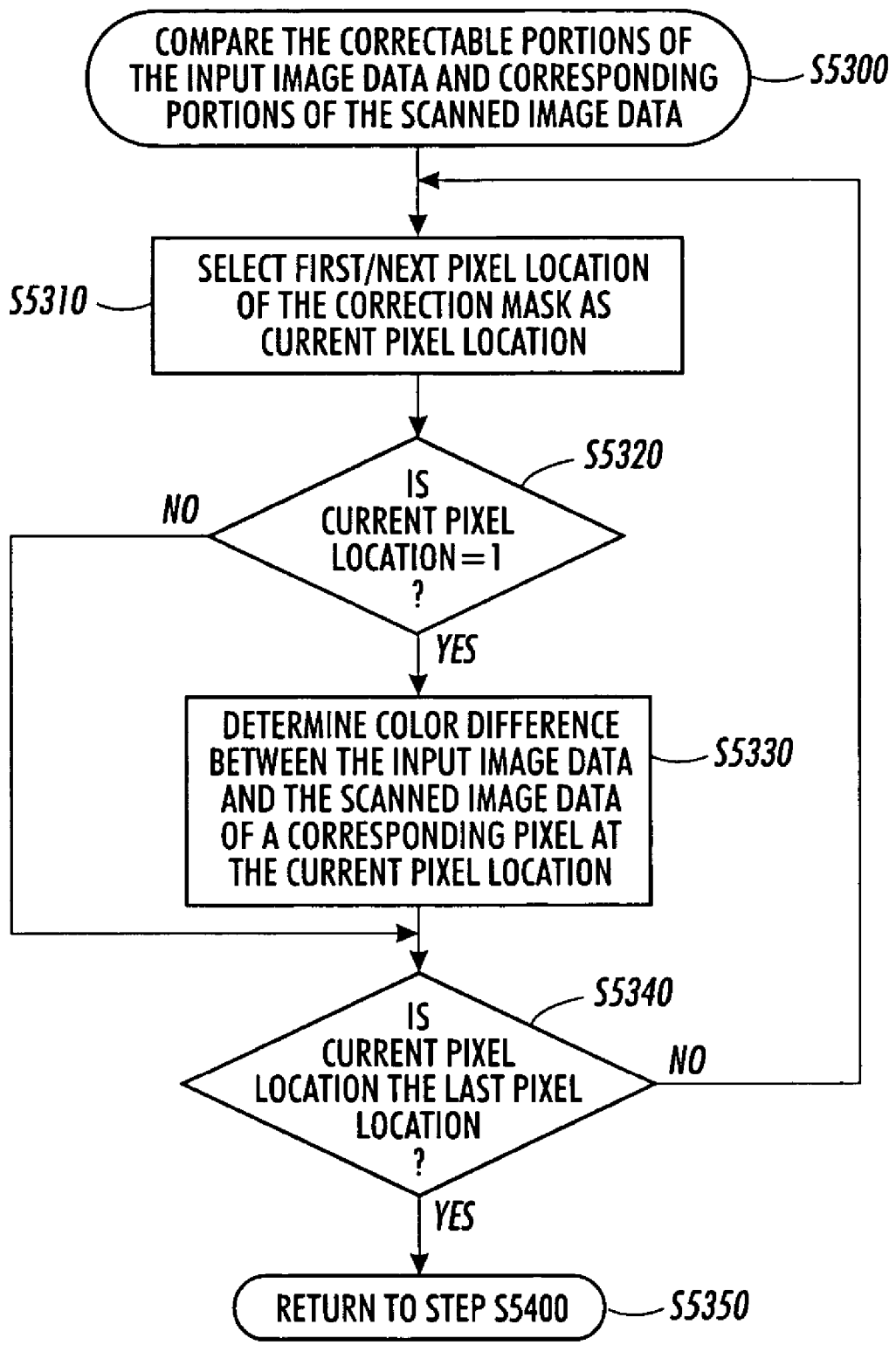
FIG. 8 is a flowchart outlining in greater detail an exemplary method of comparing the regions of interest of the input image data with corresponding regions of interest of the scanned image.

FIG. 8 is a flowchart outlining in greater detail an exemplary method of comparing the regions of interest of the input image data with the corresponding regions of interest of the scanned image data. As shown in FIG. 8, operation of the method continues from step S5300 to step S5310, where a first or next pixel location of the correction mask is selected as a current pixel location. Then, in step S5320, a determination is made whether the current pixel location is set to a true value (1). If so, operation continues to step S5330. Otherwise, operation jumps to step S5340.

In step S5330, a color difference between the input image data and the scanned image data at the current pixel location of the correction mask is determined. Then, in step S5340, a determination is made whether the current pixel location is a last pixel location. If not, operation returns to step S5310. Otherwise, operation continues to step S5350, where operation returns to step S5400.

Color difference may be only determined for each of the regions of interest that contains information that are useful in determining image quality errors in images rendered by a rendering device. When comparing the input image with the scanned image pixel by pixel, the difference is assumed to be zero (0) everywhere that the correction mask is a false value (0). Because calculation is unnecessary except where the correction mask is a non-zero true value (1), a difference in input intensities may be determined only in the identified regions of interest, e.g., at corresponding pixel locations where the correction mask is set to a true value (1).

FIG. 9 is a flowchart outlining in greater detail an exemplary method of determining errors between the input image data and the scanned image data are determined based on converted differences. Error detection may be only performed on the regions of interest containing information that are useful in determining image quality errors in images rendered by a rendering device. Printed errors may be categorized, for example, into the following three categories or groups: streaks, e.g., horizontal streaks substantially across the entire page, bands, e.g., vertical streaks substantially across the entire page, and blotches, e.g., errors that are neither horizontal nor vertical streaks.

As shown in FIG. 9, operation of the method continues from step S5500 to step S5510, where a first or next converted color difference is selected as a current converted color difference. Then, in step S5520, a first or next separation of the converted color difference is selected as a current separation. Next, in step S5530, the intensity change of the current separation is determined, as a coherent error of the current separation, based on the converted color difference. Operation then continues to step S5540.

In step S5540, a determination is made whether the current separation is a last separation of the current converted color difference. If so, operation continues to step S5550. Otherwise, operation returns to step S5520.

In step S5550, a determination is made whether the current converted color difference is a last converted color difference. If not, operation returns to step S5510. Otherwise, operation continues to step S5560, where operation returns to step S5600.

In step S5530, in order to determine a change in intensity between the original image data and the scanned image data at regions of interest, data fitting may be performed to obtain coherent errors. For example, data may be fitted using polynomial fitting coefficients as a correction polynomial that determines a change in intensity for a given scan line. An exemplary polynomial fitting is described in greater detail below.

In the exemplary system and method, the polynomial fitting may include Legendre polynomials to more accurately determine errors compared to regular polynomials of the form $a+bx+cx^2 \ldots$. The Legendre polynomials may be represented by $$P_0(x)=1$$

$$P_1(x)=1$$

$$nP_n(x)=(2n-1) \times P_{n-1}(x)-(n-1)P_{n-2}(x) \tag{1}$$

such that equation (1) yields the form:

$$A_0P_0(x)+A_1P_1(x)+ \ldots A_nP_n(x).$$

For example, given N data points indexed by j and indexing the Legendre polynomials by i, a least squares solution may be minimized to the following equation:

$$\sum_{j=1}^{N} (\tilde{y}(x_j) - y_j)^2 = \sum_{j=1}^{N} \left( \sum_{i=0}^{n-1} \alpha_i P_i(x_j) - y_j \right)^2. \tag{2}$$

Equation (2) may be expanded to $$S = \sum_{j=1}^{N} \left( \sum_{i=0}^{n-1} \alpha_i P_i(x_j) - y_j \right)^2 = \tag{3}$$

$$\sum_{j=i}^{N} \left( \begin{array}{c} \alpha_0^2 P_0^2(x_j) + 2\alpha_0 \alpha_1 P_0(x_j) P_1(x_j) + \ldots + \alpha_{n-1}^2 P_{n-1}^2(x_j) - 2\alpha_0 P_0(x_j) y_j \\ -2\alpha_1 P_1(x_j) y_j - \ldots - \alpha_{n-1} P_{n-1}(x_j) y_j + y_j^2 \end{array} \right)$$

The derivative of equation (3) respect to $a_i$ is represented by $$\frac{\partial S}{\partial \alpha_i} = \sum_{j=1}^{N} \left( 2\alpha_i P_i^2(x_j) + \sum_{ki} 2\alpha_k P_i(x_j) P_k(x_j) - 2P_i(x_j) y_j \right) = \tag{4}$$

$$2 \sum_{j=1}^{N} \left( \sum_{k=0}^{n-1} \alpha_k P_i(x_j) P_k(x_j) - P_i(x_j) y_j \right)$$

Setting the derivative of equation (4) to zero, results in $$0 = 2\sum_{j=1}^{N}\left(\sum_{k=0}^{n-1}\alpha_k P_i(x_j)P_k(x_j) - P_i(x_j)y_j\right) \Rightarrow \sum_{k=0}^{n-1}\alpha_k \sum_{j=1}^{N}P_i(x_j)P_k(x_j) = \sum_{j=1}^{N}P_i(x_j)y_j, \forall i \in [0, n-1] \quad (5)$$

The polynomial fittings may be represented in a matrix form of Ma=b, where $$a = [\alpha_0 \alpha_1 \cdots \alpha_{n-1}]^T,$$

$$M = \begin{bmatrix} \sum_{j=1}^{N}P_0(x_j)P_0(x_j) & \sum_{j=1}^{N}P_0(x_j)P_1(x_j) & \cdots & \sum_{j=1}^{N}P_0(x_j)P_{n-1}(x_j) \\ \sum_{j=1}^{N}P_1(x_j)P_0(x_j) & & & \sum_{j=1}^{N}P_1(x_j)P_{n-1}(x_j) \\ \vdots & & & \vdots \\ \sum_{j=1}^{N}P_{n-1}(x_j)P_0(x_j) & \sum_{j=1}^{N}P_{n-1}(x_j)P_1(x_j) & \cdots & \sum_{j=1}^{N}P_{n-1}(x_j)P_{n-1}(x_j) \end{bmatrix}, \quad (6)$$

$$b_i = \sum_{j=1}^{N}P_i(x_j)y_j.$$

The matrix M is symmetric, so polynomial fittings include adding into the partially accumulated sums for one triangle of the matrix and also into the right-hand-side vector b. Because the Legendre polynomials are only orthogonal over [−1,1], the input intensities are first scaled and translated to the [−1,1] range before being used in computing the additions to the partial sums.

The matrix M and right-hand-side vector b may be accumulated as if to calculate at least a cubic polynomial in the input intensities. That is, the matrix M may be a 4×4 matrix and the right-hand-side vector b may be of length 4. If most or all of the input intensities are in a narrow range, then using a high order polynomial to fit the input intensities may not be desirable. A simple average may be more accurate in determining error. Similarly if the input intensities are confined to narrow ranges, it may be undesirable to fit the input intensities with more than a straight line.

For example, by using the matrix form of the polynomial fittings in a cubic case, reduction in the size of the matrix to detect errors may be achieved. Incoming data may be histogrammed using 12 bins, each bin including at least a given fraction of the total input intensity. From the 12 bin histogram, a 2, 3 or 4 bin histogram may be created. By creating the 4 bin histogram first, a determination is made whether a cubic curve may be found. A cubic curve may be found using the entire matrix if each of the bins has at least a given fraction of the total input intensity. If a cubic curve cannot be formed, a 3 bin histogram is created to determine whether to form a quadratic curve. If each of the bins has at least a given fraction of the total input intensity a quadratic curve is formed using the (part of) the same matrix. If a quadratic curve cannot be formed, a 2 bin histogram is created to determine whether to form a line. If each of the bins has at least a given fraction of the total input intensity, a line is formed, otherwise, a simple average is taken.

It should be appreciated that a matrix and a right-hand-side vector required for lower order polynomials are contained in top left elements of a higher order matrix, and in the top elements of a right-hand-side vector. Thus, the matrix and the right-hand-side vector required for the lower order polynomials may be created by introducing the matrix and the desired order polynomial to a common solving routine, which uses the top left sub-matrix and the first n elements of the right-hand-side vector of the higher order matrix.

By using polynomial fittings, including representations in the matrix form, pixel intensity of an original image may be expressed as intensity i. In order to determine a change in intensity $\Delta i$ between the original image data and the corresponding scanned image data, a value of $\Delta i$ can be fit as a polynomial in i, where i is an independent variable and $\Delta i$ is the change in intensity or an error represented as a function of amount of original image intensity i. For each scan line that includes a region of interest, an intensity change $\Delta i$ can be determined based on the converted differences between the original image and the scanned image determined in step S5400 of FIG. 5. Therefore, an amount of colorant error for a given scan line can be represented as a function of the original image colorant data. If there is no error at all, $\Delta i$ is equal to zero (0) for the respective scan line. Therefore, polynomials represent one example of a tone reproduction curve TRC that produces a maximum absolute peak or valley representing the maximum absolute error.

A row polynomial coefficient and a column polynomial coefficient is determined for each color separation of each pixel identified as a region of interest, for example, in step S5200 of FIG. 5. For a given pixel, the respective pixel input intensity is first provided to either the column polynomial or the row polynomial for that pixel. The first result is then provided to the other polynomial to determine a coherent error of the pixel. An incoherent error may be identified by determining a difference between the scanned image with the coherent error applied and the original image.

The detailed description is directed to polynomial data fitting. However, it should be appreciated that the description is also for ease of understanding and familiarity only, and does not exclude other the types of data fitting with which the various exemplary systems and methods according to this invention are applied. For example, the data may be fitted by any known or hereafter developed method or device, such as by performing a Fourier analysis, computing statistics directly on an error map, or any other kind of useful analysis on an error map.

Figure 10:
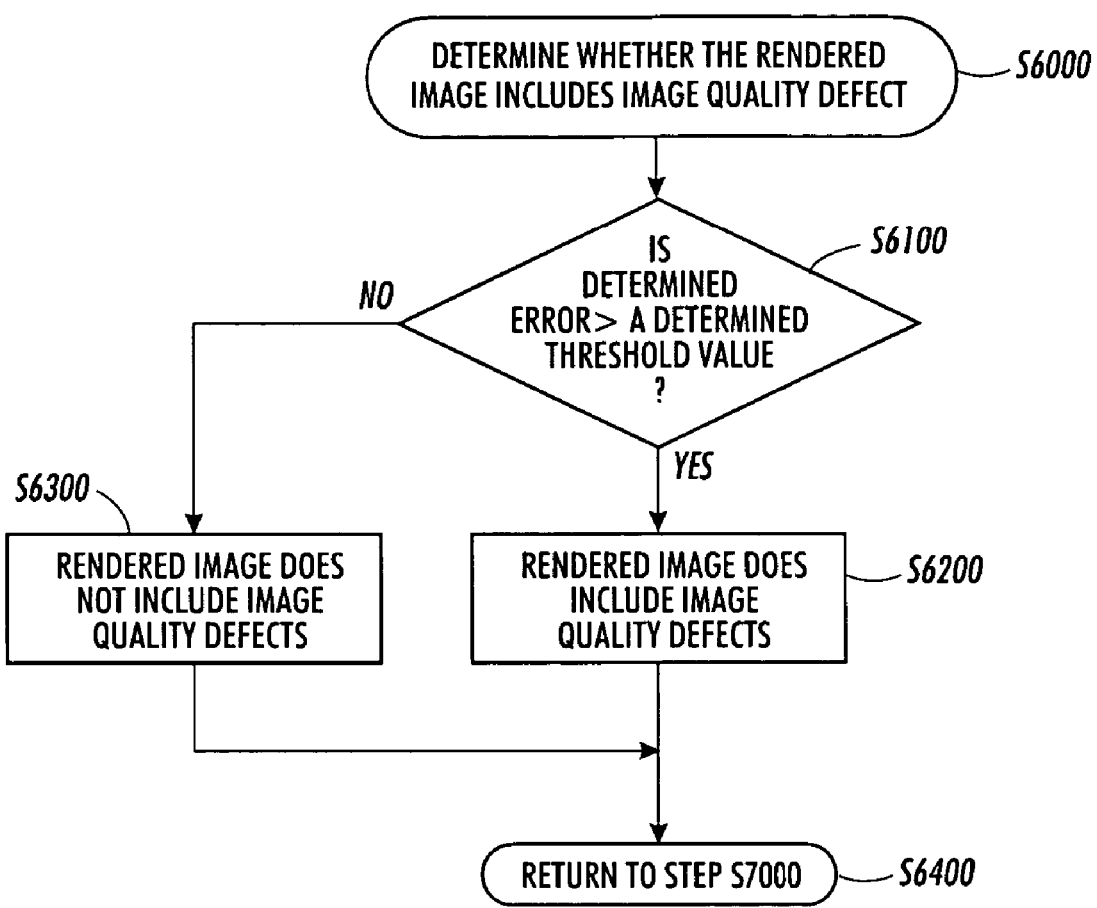
FIG. 10 is a flowchart outlining in greater detail an exemplary method of evaluating the rendering device.

FIG. 10 is a flowchart outlining in greater detail an exemplary method of determining whether images rendered by a rendering device include an image quality defect. As shown in FIG. 10, operation of the method continues from step S6000 to step S6100, where a determination is made whether the determined coherent errors and/or incoherent errors are greater than a predetermined threshold value. If so, operation continues to step S6200. Otherwise, operation jumps to step S6300.

In step S6200, the images rendered by the rendering device are determined to include image quality defects. Operation then continues to step S6400. In step S6300, the images rendered by the rendering device are determined not to include image quality defects. Operation then continues to step S6400, where operation continues to step S7000.

Although the errors correspond to inputs within the regions of interest having a certain range of intensities (i.e. only that range of intensities actually observed in those regions on that page), it may be desirable to keep track of the gray or intensity levels that were considered in order to determine if it is safe to interpolate intensity levels beyond the previously considered intensity levels. Furthermore, considering more values between the maximum intensity level and the minimum intensity level provides more accuracy in determining errors in pixels having intensity levels outside the ones previously considered. By increasing the number of pages containing useful regions, more input intensity levels may be considered, both within the original range and outside that range. In addition, more regions of interest may be found by considering a larger set of pages.

Figure 11:
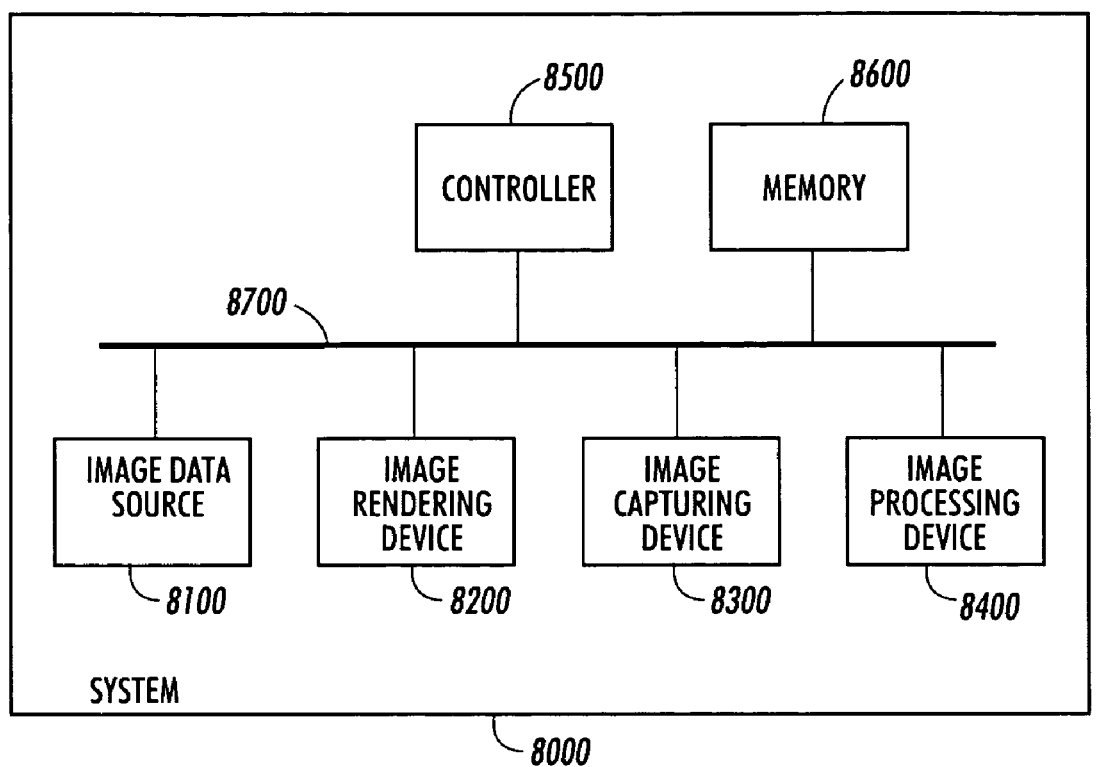
FIG. 11 is a block diagram outlining an exemplary system for detecting image quality defects in a rendered image and evaluating the rendering device.

FIG. 11 is a block diagram outlining an exemplary system for detecting image quality defects in a rendered image and evaluating the rendering device. As shown in FIG. 11, the system 8000 includes an image data source 8100, an image rendering device 8200, an image capturing device 8300, a processing device 8400, a controller 8500, and a memory 8600, each appropriately connected by one or more control and/or data buses 8700.

The image data source 8100 may be a device such as a computer system, a storage device, a scanner, a facsimile machine, or any other known or hereafter developed device capable of providing electronic image data. The image data source 8100 is arranged to provide image data of an original image to the image rendering device 8200 and the processing device 8400.

The image rendering device 8200 may be a printer or other known or hereafter developed device capable of rendering an image in a tangible medium or an electronic medium. The image rendering device 8200 is arranged to provide image data of the rendered image to the image capturing device 8300.

The image capturing device 8300 may be a device such as a camera, a scanner, or any other known or hereafter developed device capable of capturing the rendered image. The image capturing device 8300 is arranged to provide image data of the captured image to the processing device 8400.

The processing device 8400 may be a device such as a computer system, a processor or other device capable of manipulating and/or analyzing image data. The processing device 8400 receives the original image data from the image data source 8100 and the captured data from the image capturing device 8300. The processing device 8400 then compares the original image data and the captured image data on a pixel by pixel basis to identify regions of interest.

The processing device 8400 subsequently determines errors between the original image data and the captured image data in the identified regions of interest. Based on the determined error, the processing device may determine image quality defects in a rendered image and evaluating the image rendering device 8200.

The memory 8600 may be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like.

The exemplary system for determining whether the rendering device is defective according to FIG. 11 operates in the following manner.

In operation, original image data is output from the original data source 8100. The controller 8500 receives the original image data, then stores the original input data in the memory 8600 at any desirable resolution. Then, the controller 8500 converts the original input data to a form that is recognized by image processing algorithms stored in the memory 8600 and in a color space of the image rendering device 8200. The controller 8500 then stores the converted image data in the memory 8600.

The controller sends the converted input data to the image rendering device 8200 which renders the converted original image data in a tangible medium or an electronic medium. The controller 8500 then stores the rendered image including rendered image data in the memory 8600.

The image capturing device 8300 captures the fed rendered image. The controller 8500 then provides the captured image data in the memory 8600 and subsequently to the processing device 8400. The processing device processes the captured image data at a resolution corresponding to the resolution of the stored converted original image data, and the controller 8500 inputs the reduced resolution captured image into the memory 8600 for storage. Then, the controller 8500 inputs the reduced resolution captured image data and the converted original image data into the processing device 8400.

The processing device 8400 processes the converted original image data and the captured image data to identify regions of interest, and to compare the converted original image data and the captured image data on a pixel by pixel basis to determine errors at the identified regions of interest. The processing device 8400 subsequently determines errors between the original image data and the captured image data in the identified regions of interest. Based on the determined error, the processing device may determine image quality defects in a rendered image and evaluate the image rendering device 8200 to determine an amount of adjustment or repaired to reduce or even avoid the image quality defects While various details have been described above, various alternative, modifications and variations are possible. Accordingly, the details and implementations set forth above are intended to be illustrative, not limiting.

What is claimed is:

1. A method of detecting image quality defects, comprising:

obtaining an electronic image including electronic image data;

rendering an image based on the electronic image data;

capturing the rendered image, the captured image including captured image data;
registering the electronic image with the captured image;
identifying at least one region of interest in the electronic image; and
comparing the electronic image data of the at least one region of interest in the electronic image and the captured image data of a corresponding region to determine a colorant error, wherein
rendering the image comprises performing a preliminary analysis of the electronic image data to determine eligibility for the comparison, the performing a preliminarily analysis comprising (i) determining if an amount of coverage of the electronic image data exceeds a predetermined threshold value, (ii) determining if there are enough distinct features in the electronic image data for registration, and (iii) determining if an amount of the current image data is within a predetermined range in at least one color separation.

2. The method according to claim 1, wherein identifying the at least one region of interest in the electronic image includes setting a value of the at least one region of interest in the electronic image to a first predetermined value.

3. The method according to claim 2, wherein identifying the at least one region of interest in the electronic image further includes setting a value of portions other than the at least one region of interest in the electronic image to a second predetermined value.

4. The method according to claim 2, wherein comparing electronic image data of the at least one region of interest in the electronic image and the captured image data at the corresponding region comprises comparing data at the region of interest having the first predetermined value.

5. The method according to claim 2, further comprising identifying at least one region of interest in the captured image.

6. The method according to claim 5, wherein identifying the at least one region of interest in the captured image includes setting a value of the at least one region of interest in the captured image to the first predetermined value.

7. The method according to claim 6, wherein identifying the at least one region of interest in the captured image includes setting a value of portions other than the at least one region of interest in the captured image to the second predetermined value.

8. The method according to claim 6, wherein comparing the electronic image data of the at least one region of interest in the electronic image and the captured image at the corresponding region comprises comparing data where both the region of interest and the corresponding region has the first predetermined value.

9. The method according to claim 1, further comprising converting each colorant error from a device independent color space to a device dependent color space.

10. The method according to claim 9, wherein the device independent color space is one of L*a*b* and RGB color space.

11. The method according to claim 9, wherein the device dependent color space is CMYK color space.

12. The method according to claim 1, further comprising mapping input intensity of the electronic image, at each region of interest, to the colorant error for the corresponding region of interest.

13. The method according to claim 12, further comprising detecting defects in the rendered image based on the mapping.

14. The method according to claim 1, wherein comparing the electronic image data and the captured image data comprises comparing a reduced resolution of the electronic image data and a reduced resolution of the captured image data.

15. The method according to claim 1, wherein the electronic image includes a plurality of electronic image pages.

16. A system for detecting image quality defects, comprising:
an image data source that provides image data of an original image;
an image rendering device that provides a rendered image of the original image, and that performs a preliminary analysis of the electronic image data to determine eligibility for the comparison by determining (i) if an amount of coverage of the electronic image data exceeds a predetermined threshold value, (ii) if there are enough distinct features in the electronic image data for registration, and (iii) if an amount of the current image data is within a predetermined range in at least one color separation;
an image capturing device that captures the rendered image; and
a processing device that processes the original image data and the captured image data to detect at least one region of interest, compares the image data of the at least one region of interest with the captured image, and determines colorant errors in the rendered image at the regions of interest.

17. A computer readable medium including instructions for detecting image quality defects, comprising:
instructions for obtaining an electronic image including electronic image data;
instructions for rendering the electronic image data;
instructions for capturing the rendered image, the captured image including captured image data;
instructions for registering the electronic image with the captured image;
instructions for identifying at least one region of interest in the electronic image; and
instructions for comparing the electronic image data of the at least one region of interest in the electronic image and the captured image data of a corresponding region to determine a colorant error, wherein
instructions for rendering the electronic image data comprises instructions for performing a preliminary analysis of the electronic image data to determine eligibility for the comparison, the instructions for performing a preliminarily analysis comprising instructions for (i) determining if an amount of coverage of the electronic image data exceeds a predetermined threshold value, (ii) determining if there are enough distinct features in the electronic image data for registration, and (iii) determining if an amount of the current image data is within a predetermined range in at least one color separation.

* * * * *